Dec. 23, 1969     R. G. ALEXANDER     3,485,520
SELF-LOCKING CONNECTION BETWEEN RIGID MEMBERS
AND METHOD OF MAKING SAME
Filed May 1, 1968

INVENTOR:
RAYBURN G. ALEXANDER
BY: *Milmore & Cypher*
HIS ATTORNEYS

# United States Patent Office 3,485,520
Patented Dec. 23, 1969

3,485,520
SELF-LOCKING CONNECTION BETWEEN RIGID MEMBERS AND METHOD OF MAKING SAME
Rayburn G. Alexander, Redwood City, Calif.
(569 Hawthorne Ave., San Bruno, Calif. 94066)
Filed May 1, 1968, Ser. No. 725,619
Int. Cl. F16b 7/00; F16d 1/00
U.S. Cl. 287—126                9 Claims

ABSTRACT OF THE DISCLOSURE

Two rigid structural members are non-rotatably united by a self-locking connection which comprises (a) a counterbore in one member having an outer cylindrical alignment part and substantially coaxial therewith an inner non-circular, e.g., square, part, and (b) a projection on the other member contained within the counterbore and including substantially coaxial sections each fitting with a slight clearance, less than 0.002 inch, within one of the parts of the counterbore, the parts being restrained against axial separation by lateral binding caused by random deviations from true coaxiality of the parts of the counterbore and/or sections of the projection. The members can be separated by applying a sufficient tension to pull the projection out of the counterbore; or they can be permanently united by applying a bonding agent, e.g., a thermosetting resin and heating.

The counterbore is formed by first machining the cylindrical part of the counterbore and thereafter inserting a non-circular electrode and advancing the electrode coaxially with the cylindrical part while applying an electrical potential and disintegrating parts of the member.

---

The invention relates to a non-rotatable connection between rigid structural members which is self-locking and joins the members in precise alignment, i.e., wherein the members are joined precisely along a common axis and are restrained against pulling apart by frictional forces developed in the operation of uniting the members, whereby the connection affords at least some restraint against separation. It relates further to a method of forming a counterbore suitable for the connection.

It is known to form a connection between shafts, such as the sections of a fishing pole, by stabbing a strongly tapered end of one section into a similarly tapered ferrule in the end of the other section, there being additional cylindrical, mating sections on both parts (U.S. patent to Leonard, No. 169,181). However, such a connection could not transmit torque positively and only a low degree of frictional tightness was attainable because of the non-rigid nature of the touching parts. Moreover, such a connection is not suitable for interconnecting members such as shafts and controls for instruments and machines wherein precision in the alignment between the members is essential, since thin-metal ferrules are used.

It is, further, known to unite structural members by driving a projection on one into a hole of smaller size formed in the other, to effect a frictional connection; also, it is known to form a part of the projection with a square cross section to improve the transmission of torque. For example, a screw driver shank having a square end section may be driven into a hole in a handle to broach the end of the hole (U.S. patent to Chantrell, No. 419,638). However, such connections could be made only by strong forces and special equipment which would form or enlarge the hole in one member and were not suitable for operations requiring the facile and precise connection of members. Moreover, the members could not be readily separated.

Connections using threaded elements are also known (U.S. patents to Bauser, No. 154,444 and to Ivory, No. 634,732). A drawback of these is that they are time-consuming and often fail to transmit torque in both angular directions.

Connections utilizing screwed-on collars or clamps are also known, but involve the use of several parts, are not rapidly made, and usually do not attain precision fits.

It has also been difficult to form in metallic objects counterbores in which the outer part is cylindrical of circular cross section and the inner part is non-circular and of substantially constant cross section. While machining of the outer part presents no problem, it is extremely difficult to cut away the metal of the non-circular inner part without access to the base of the hole. Such counterbores were, therefore, most often made by working on a separate structural piece having an opening at both ends and then attaching it to another member.

It is an object of the present invention to provide a self-locking connection between rigid structural members which can transmit torque, unites the members precisely, and requires no special tools or jigs to unite the members and yet restrains the members against separation.

Another object is to provide a connection as indicated in the preceding paragraph which can be repeatedly made by merely pushing two parts together and unmade by pulling them apart.

An alternative object is to provide a connection as indicated in the first object wherein the parts are permanently interconnected.

Still another object is to provide a facile method for forming a counterbore in metallic material in which the inner part of the counterbore has a non-circular, e.g., a polygonal such as a square cross section.

In summary, according to the invention, one of the rigid members has formed therein, e.g., in the end of shaft, a counterbore including a substantially cylindrical outer part of circular cross section and, substantially coaxial therewith, an inner part of substantially constant, non-circular cross section, and the other member has a projection with two substantially coaxial sections which fit within the corresponding parts of the counterbore and are slightly smaller than those parts, but are fitted with such close fits that essentially perfect alignment between the members is achieved and the slight deviation from true coaxial relation between the parts of the counterbore and/or the sections of the projection cause a wedging action as the tip of the projection enters the inner part of the counterbore, to secure the members by friction. The said deviations may be angular and/or a lateral displacement of centerlines.

The two members may be of any rigid material, such as a metal, a metal alloy, metallic plastic, or non-metallic plastic. The term "metallic" is used herein to denote generically metals, metal alloys and plastics which are loaded with metal or metal alloys. The counterbore may be formed by the method described hereinafter if the member is of metallic material; if non-metallic, a similar series of operations may be used, with the difference that the electrode is replaced by a hot tool of similar shape and that no electrical potential is applied, the hot tool acting to form the inner part of the counterbore by thermal action or burning.

The method of forming the counterbore in a metallic member includes two operations, of which the first is machining the cylindrical outer part. This may involve drilling or boring and finishing, to form a hole of circular cross section and precise dimensions. The second operation is the formation of the inner part by the use of an electrical discharge machine, which is known per se. Optionally, a preliminary step in this second operation is the machining of a circular hole in the member concentrically with and beyond the base of the outer part to remove the bulk of the material, the circular hole having a diameter less than the greatest lateral dimension of the ultimate inner part. An electrode, e.g., of carbon, a metal or a metal alloy, such as steel, copper, brass, of non-circular cross section and having a maximum lateral dimension less than the diameter of the outer cylindrical part, is inserted into the said part and centered therein by a suitable jig or tool which includes means for advancing the electrode in the direction of the axis of the said outer part. After the electrode is centered an electrical potential is applied between it and the member and the electrode is advanced along the said axis to disintegrate metal from the member by electrical discharge, thereby forming the inner part of the counterbore.

The electrode is centered within the outer cylindrical part and advanced by mechanism which is known in connection with electrical discharge machines and, therefore, not described herein. Such mechanism includes electrical or electronic indicators which indicate deviations of the electrode from the center as small as 0.001 inch or less. Usually, a direct current potential is applied between the electrode and the member while advancing the electrode, and an alternating current potential is applied while retracting the electrode. The non-circular, inner part of the counterbore is usually slightly wider toward the outside of the hole than at its inner end, causing a slight taper of the order of 0.1 to 1° (angle of convergence between opposed walls). This taper may be lessened or virtually eliminated by making several successive traverses of the electrode into the hole.

Having indicated the general nature of the invention and described the method of forming the counterbore, reference is made to the accompanying drawing showing certain preferred embodiments, wherein.

Figure 1:
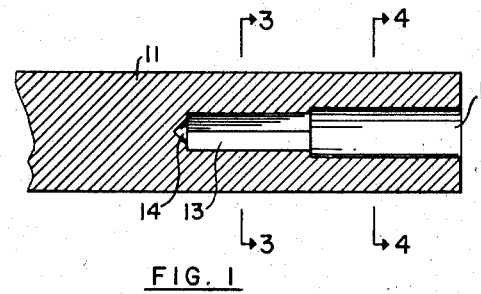
FIGURE 1 is a longitudinal section through a shaft constituting one member.
Figure 3:
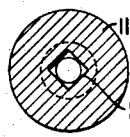
FIGURES 3 and 4 are transverse sections taken on the correspondingly numbered section lines of FIGURE 1.
Figure 4:
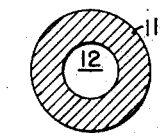

Referring to FIGURES 1, 3 and 4, the first member is a shaft 11, e.g., of metal, having at its end a counterbore situated precisely coaxially with the shaft, when the shaft is of circular cross section. The counterbore includes an outer, substantially cylindrical part 12 of circular cross section and an inner, torque transmitting part 13 of non-circular, e.g., square, and substantially constant cross section. These parts are coaxial and the greatest lateral dimension of the inner part is less than the diameter of the part 12. The said lateral dimension may be only slightly less than the diameter, as shown, or may be considerably less, e.g., down to one-half or less of the diameter. Each of these parts has a length greater than one-half of the said diameter, and greater lengths, from about one to two diameters, as shown, are preferred. The length of the part 12 is preferably greater than that of the part 13.

The cylindrical part 12 is formed by any suitable machining operation, and the inner part 13 is formed by electrical disintegration, using a centered electrode which is advanced coaxially while an electrical potential is applied, as was previously described. When a small circular hole is machined prior to the use of the electrode, a small conical hole 14 may remain. The shape of the electrode corresponds to the cross section of the part 13, viz., square in this embodiment, and the size of the hole part 13 is only slightly larger than the electrode, usually less than 0.003 inch larger. Although the electrode is centered and advanced concentrically as precisely as good shop practice permits, there is unavoidably a small lateral and/or angular deviation of the parts 12 and 13 from true coaxiality, in amount such that the wall at one side of the part 13 is displaced toward the axis by an amount less than 0.003 inch from where it would be if true coaxiality prevailed.

Figure 2:
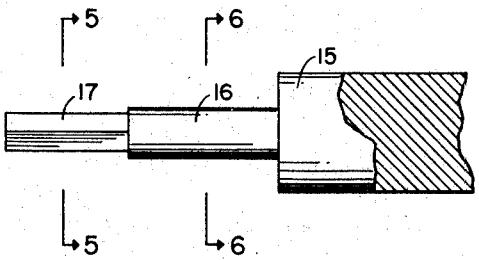
FIGURE 2 is an elevation, partly in longitudinal section, of another shaft constituting the other member.
Figure 5:
FIGURES 5 and 6 are transverse sections taken on the correspondingly numbered section lines of FIGURE 2.
Figure 6:
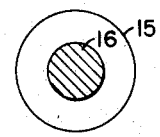

FIGURES 2, 5 and 6 show another shaft 15, constituting the second member, which has formed integrally therewith at one end a projection which is precisely coaxial with the shaft when the latter is of circular cross section. The projection includes a substantially cylindrical section 16 of circular cross section and a non-circular tip section 17, also of substantially constant cross section. These sections have lengths which may be as described for the parts 12 and 13 of the counterbore; in any case, the length of the section 16 is preferably not greater than that of the part 12. Further, these sections are machined and finished to fit the parts 12 and 13, respectively, with very minute clearances, usually less than 0.002 inch and, preferably, less than 0.001 inch. Despite good shop practice, some small deviation from true coaxiality usually occurs, although this is usually less than in the case of the parts 12 and 13.

Figure 7:
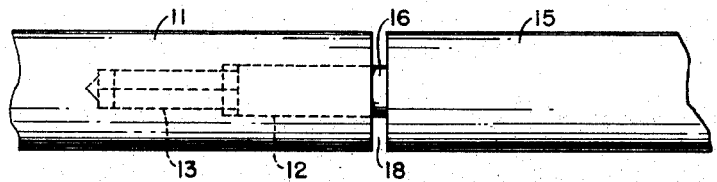
FIGURE 7 is an elevation of the shafts joined by the connection.

In forming the connection, the prong on the shaft 15 is inserted into the counterbore. The length of the part 12 being less than that of the section 17, the shafts are brought into almost perfect alignment by the coaction between the part 12 and section 16. When the tip 17 abuts the inner end of the cylindrical part 12, one shaft is rotated with respect to the other to orient the tip with the part 13 and the shafts are then pushed together. This results in binding at the sides of the sections 16 and 17 against the walls of the counterbore and the parts are wedged together and secured frictionally. When assembled, the shafts appear as is shown in FIGURE 7, which shows a small gap 18 between the ends of the shafts. The firmness of the connection and its resistance to axial tension between the shafts is related to the force applied in pushing them together, and the use of greater force, causing a diminution in the width of the gap 18, increases the wedging action and the holding power of the connection. This may be of the order of 1 to 100 or more pounds.

It is evident that the connection is completely self-locking and requires no extraneous parts. It can be disassembled and re-made as desired.

If desired, the connection can be made non-severable by applying adhesive to the projection on the shaft 15 and/or to the counterbore. For example, a thermo-setting resin may be applied before assembling the shafts and the connection heated to set the resin. A resin suitable for this purpose is available commercially in the U.S.A. under the trade name Lock Tight.

Figure 8:
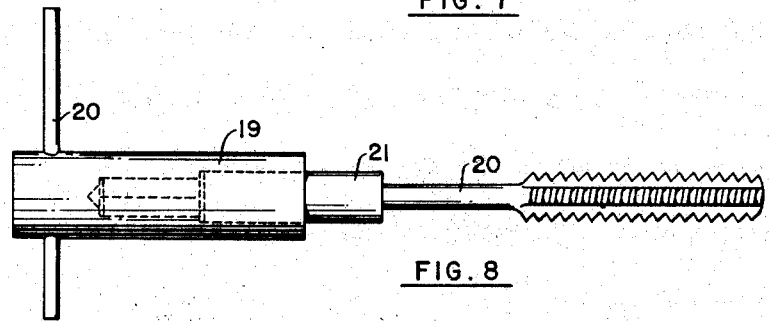
FIGURE 8 is an elevation of a tap and holder, interconnected by the connection of the invention.

FIGURE 8 shows the invention applied to a tap, including a holder 19 having a handle 20 and formed at its end with a counterbore as was described for FIGURES 1, 3 and 4. The replaceable tap 21 has an integral projection 21 which is formed as was described for FIGURES 2, 5 and 6. The tap is replaceably connected to the holder by merely inserting it, causing it to be held by the wedging action against falling out and in torque-transmitting relation by the non-circular part 13 and section 17.

As was previously indicated, the parts of the counterbore and the sections of the tip may have constant cross sections throughout their lengths, and effective wedging action occurs without a taper. However, a very small taper, less than 1°, is permissible in any of these parts and sections, and may be desirable to counteract loss of wedging action when the parts are repeatedly connected and disassembled. Such a taper is preferable between about 0.1 and 0.5° and such that the opposed walls converge toward the interior of the counterbore and the end of the tip. Usually, such a taper is provided only in the part 13 and/or the section 17.

Figure 9:
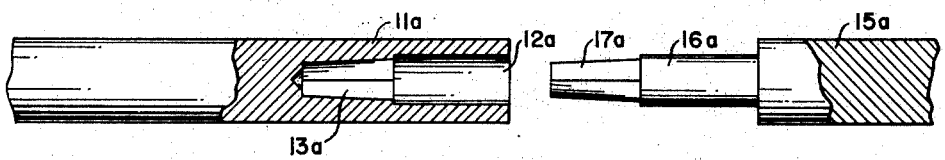
FIGURE 9 is a view corresponding to FIGURE 1 showing a modified construction, the degree of taper being exaggerated for clarity.

FIGURE 9 shows a shaft 11a having a counterbore which includes a substantially cylindrical part 12a and a tapered inner part 13a, the degree of taper being exaggerated.

Figure 10:
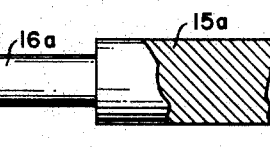
FIGURE 10 is a view corresponding to FIGURE 2 showing another modified construction, the degree of taper being exaggerated for clarity.

FIGURE 10 shows a shaft 15a having a tip which includes a substantially cylindrical section 16a and a tapered tip 17a, the degree of taper being exaggerated.

I claim as my invention:

1. A rigid, non-rotatable connection between two rigid structural members, which comprises:
   (a) a counterbore in one of said members which includes in substantial coaxial relation an outer alignment part of circular cross section and an inner, torque-transmitting part of noncircular cross section, the greatest transverse dimension of the latter part being smaller than the diameter of the former part, each of said parts being of substantially constant cross section and having a length greater than one-half of said diameter, and
   (b) a projection on the other of said members contained within said counterbore, said projection including in substantial coaxial relation an alignment section having a circular cross section of diameter slightly smaller tahn the said diameter of the alignment part to effect a close sliding fit therewith and a tip of non-circular cross section which is slightly smaller than the cross section of said inner part, said tip being contained within said inner part, each of said sections being of substantially constant cross section and having a length greater than one-half of said diameter of the alignment part,
   (c) said members being restrained against separation by lateral pressure of the tip against the side of the inner part of the counterbore due to alignment of the projection effected by the close fit between the alignment part and section and slight deviation from true coaxial relation in at least one of said members.

2. A connection as defined in claim 1 wherein said members are restrained solely by said lateral pressure against separation by a force between one and 100 pounds and can be separated by a pull between about one and 100 pounds.

3. A connection as defined in claim 1 wherein the cross sections of the inner part of the counterbore and the tip of the projection are regular polygons.

4. A connection as defined in claim 1 wherein each of said parts of the counterbore and each of said sections of the projection have substantially uniform cross sections such that opposite walls thereof are parallel to within 1°.

5. A connection as defined in claim 1 wherein at least one of said parts of the counterbore has a taper such that the opposite walls converge inwardly at an angle between 0.1 and 0.5°.

6. A connection as defined in claim 1 wherein at least one of said sections of the projection has a taper such that the opposite walls converge toward the tip at an angle between 0.1 and 0.5°.

7. A connection as defined in claim 1 wherein the sections of the projection have clearances with the corresponding parts of the counterbore of less than 0.002 inch.

8. A connection as defined in claim 1 wherein said members are metallic.

9. A connection as defined in claim 8 wherein the cross sections of said inner part of the counterbore and the tip of the projection are regular polygons, the wall surrounding the counterbore is of one piece with said member containing the counterbore, and the sections of the projections have clearances with the corresponding parts of the counterbore of less than 0.002 inch.

References Cited

UNITED STATES PATENTS

| | | | |
|---|---|---|---|
| 233,486 | 10/1880 | Donaldson | 279—102 |
| 254,861 | 3/1882 | Bolton | 279—93 X |
| 1,379,125 | 5/1921 | Reinhalter | 279—102 |
| 1,951,248 | 3/1934 | Litchfield | 306—41 |
| 2,921,326 | 1/1960 | Lautmann | 287—126 X |
| 3,053,118 | 9/1962 | Lavalee | 287—126 X |

DAVID J. WILLIAMOWSKY, Primary Examiner

W. L. SHEDD, Assistant Examiner

U.S. Cl. X.R.

306—41; 279—102; 64—27; 15—145